Class & Napp,
Liquor Meter.
No. 98,667. Patented Jan. 11, 1870.

Witnesses.
Geo. W. Tibbitts
J. Holmes

Inventors
William F. Class
Wilhelm Napp

UNITED STATES PATENT OFFICE.

WILLIAM F. CLASS AND WILHELM NAPP, OF CLEVELAND, OHIO.

IMPROVEMENT IN LIQUID-METERS.

Specification forming part of Letters Patent No. 98,667, dated January 11, 1870.

*To all whom it may concern:*

Be it known that we, W. F. CLASS and W. NAPP, of Cleveland, in the county of Cuyahoga and State of Ohio, have invented certain new Improvements in Fluid-Meters, of which the following is a specification:

The nature of this invention relates to a measuring apparatus for ascertaining the flow of water or other liquids; and consists of a bucketed wheel, arranged in an inclined position within a chamber containing compressed air in equal proportions with the water, the index device being placed above the measuring-wheel, the top of the case having a light of glass set in it, leaving the indicator in full view, as well as the other mechanism.

Figure 1:
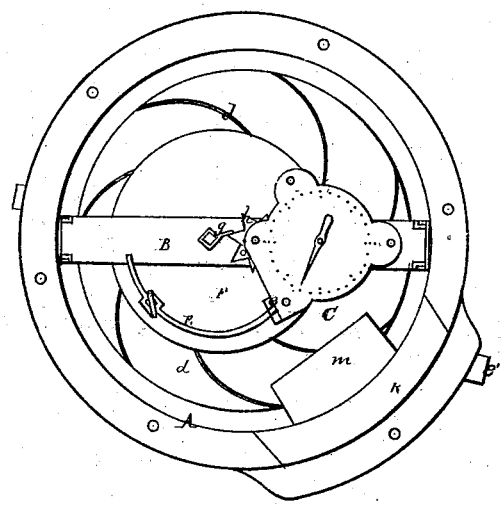
Figure 2:
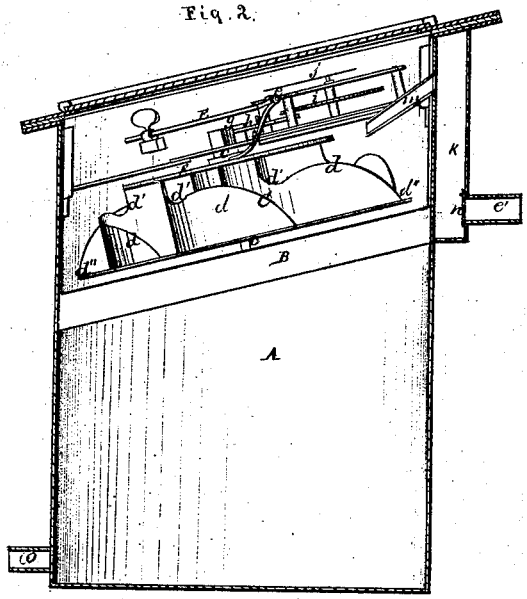

Figure 1 is a top view. Fig. 2 is a side view with part of outside case removed.

In the drawings, A represents a cylindrical case of metal, having a tight bottom, the top of which is made slanting, the ring or cover being provided with a glass panel, for the purpose of permitting the inside mechanism to be seen. Between the flange and the cover is a packing-ring, of rubber or other suitable material, to make the case air-tight. Within the case A is arranged the measuring mechanism, located in the upper part above the water-line. B is a frame, placed in a slanting position, as represented, in which is a bucketed wheel, C, turning freely on journals $c$ $c$, having their bearings in the frame A. This wheel is constructed with curved buckets $d$ $d$. The bottom being straight, and the wheel resting in an inclined position, the buckets will hold a given amount of water. The top edge of the buckets $d$ is cut down at $d'$ sufficiently low to prevent the water flowing over the edge at $d''$, but rather into the bucket beyond, in case it should overflow; but it is not intended to have it overflow, the wheel being so controlled by the friction-governor E. A circular plate, F, is placed on the top of the buckets, upon which the arm of the governor bears. The governor consists of a weighted lever, E, hinged at $e$, having a bent arm, $f$, which comes in contact with the plate F. Attached to the journal of the wheel is a small lever, $g$, which, when the wheel revolves, strikes against the teeth of a wheel, $h$, said wheel $h$ in its revolutions turning a wheel, $i$, to which is attached a pointer, $j$, which indicates, in given quantities, the amount of water passing through the wheel C. To the side of the case A is a small chamber, $k$, having a capacity greater, however, than the inlet-pipe $e'$. From the chamber $k$ is a broad spout, $m$, which discharges the water into the buckets $d$ $d$. The water is allowed to fall of its own weight, and not by any acquired force. A valve, $n$, is placed over the pipe $e'$, so that, when the water is not flowing from the discharge, pipe $o$ will close by the force of atmosphere in the case A.

The operation of this meter is as follows: The pipe $e'$ connects with the supply, and is the inlet through which the water must pass. It is conducted to the wheel by the spout $m$, and, as the wheel revolves, is emptied into the case A, and conveyed off through the outlet-pipe $o$.

It is not necessary to create any artificial force of air in the case A, as the force of water and air finds its own equal, and is such as will not submerge the measuring apparatus.

This mode of construction makes a very reliable, cheap, and durable meter for measuring the flow of liquids.

We claim as our invention—

1. The wheel C, constructed with the curved buckets $d$ $d$, as described, and playing in an inclined plane, as shown, and for the purpose set forth.

2. The bucketed inclined wheel C, in combination with the air-tight case A.

WILLIAM F. CLASS.
WILHELM NAPP.

Witnesses:
GEO. W. TIBBITTS,
J. HOLMES.